Figure 1:
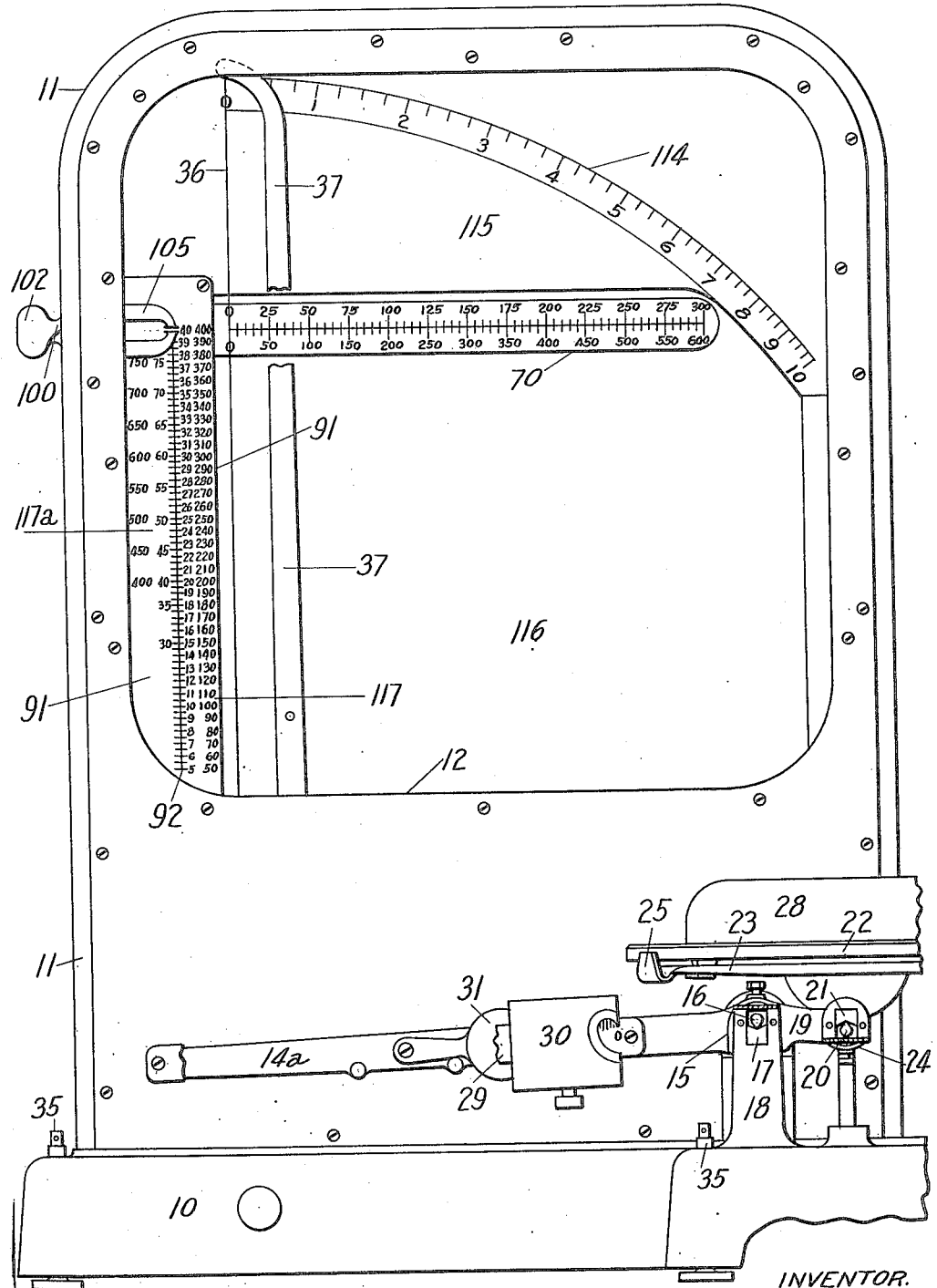

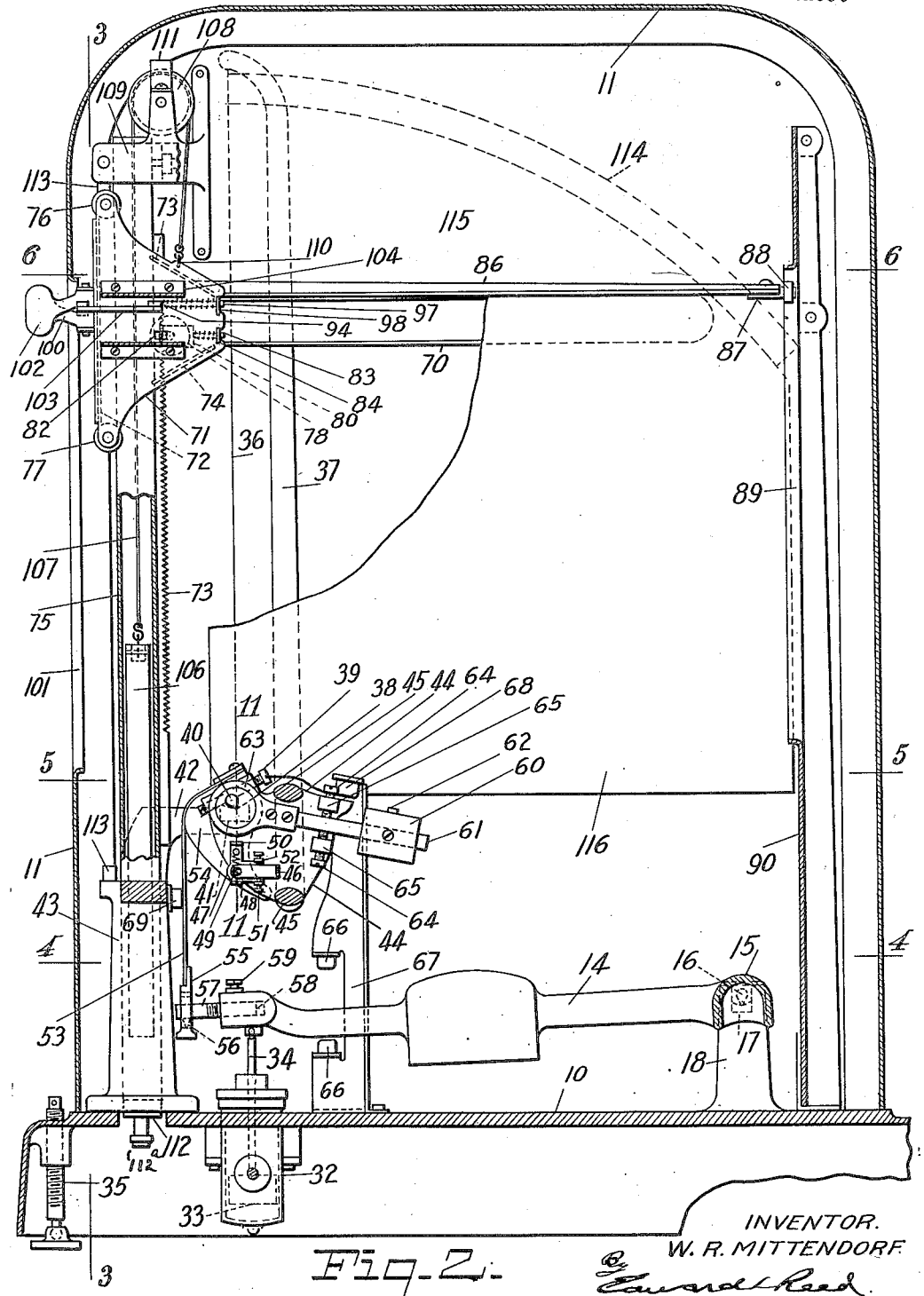

Nov. 22, 1927.
W. R. MITTENDORF
COMPUTING SCALE
Filed Dec. 2, 1925
1,650,228
5 Sheets-Sheet 3
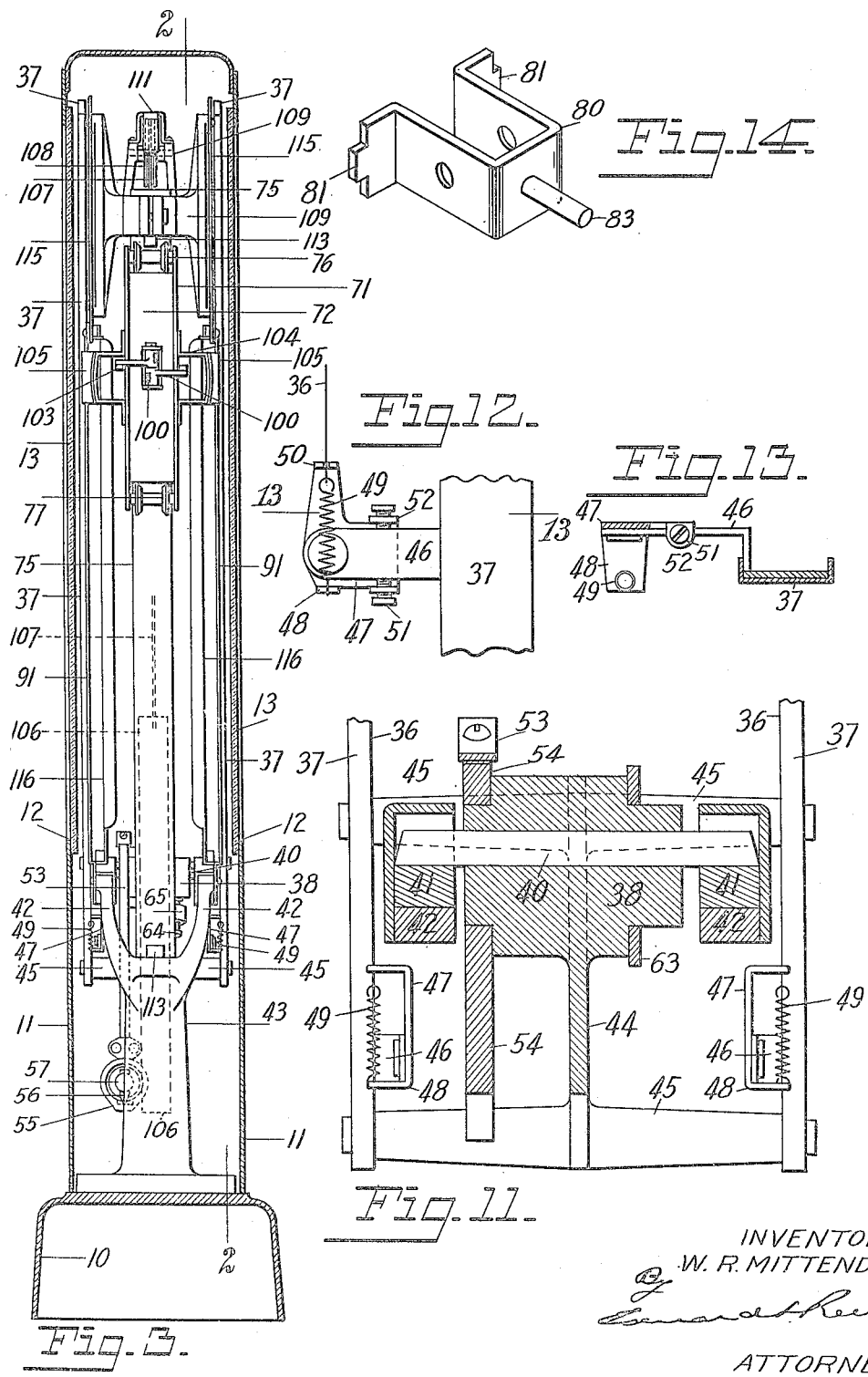
INVENTOR.
W. R. MITTENDORF.
ATTORNEY.

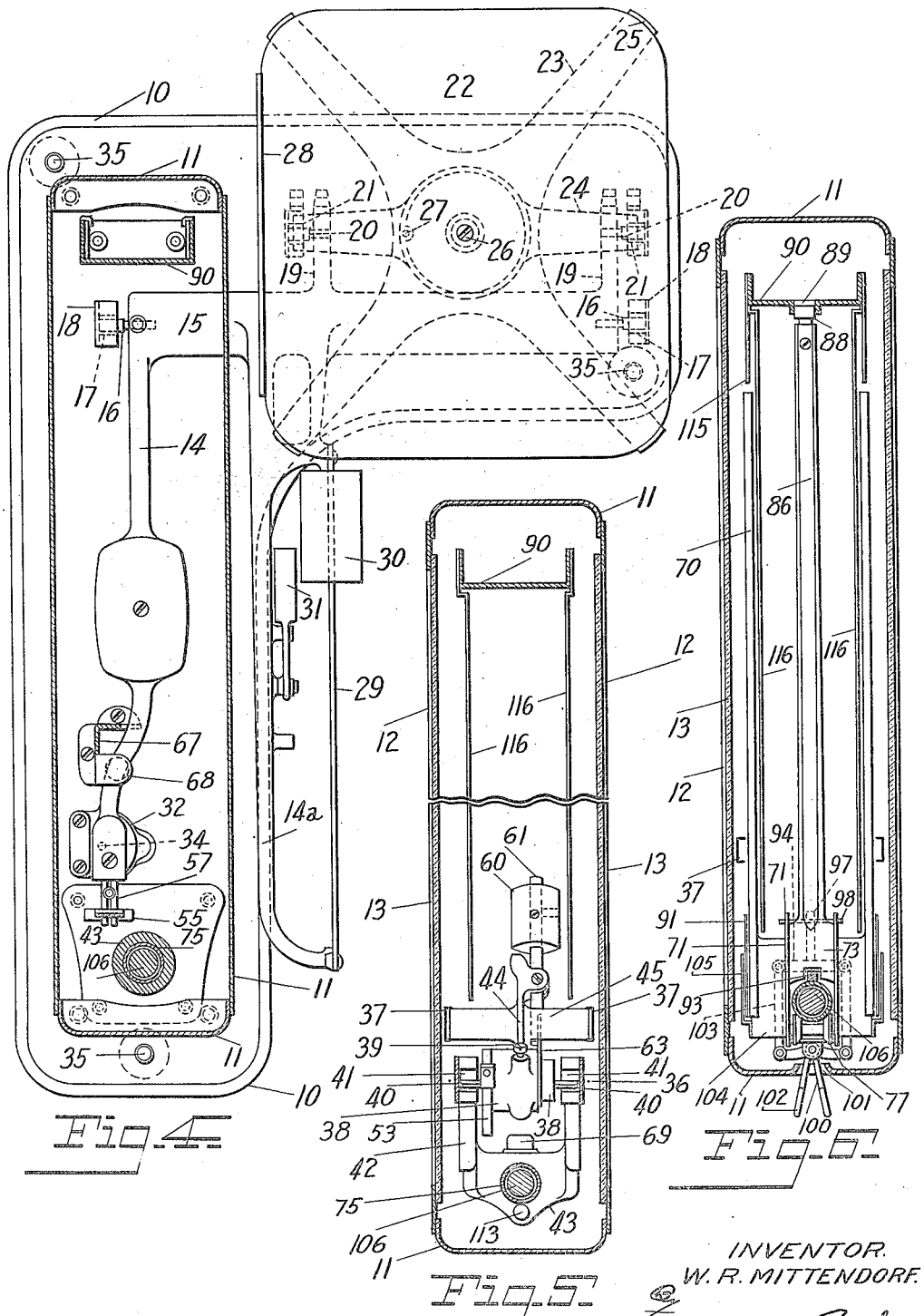

Nov. 22, 1927.  
W. R. MITTENDORF  
COMPUTING SCALE  
Filed Dec. 2, 1925
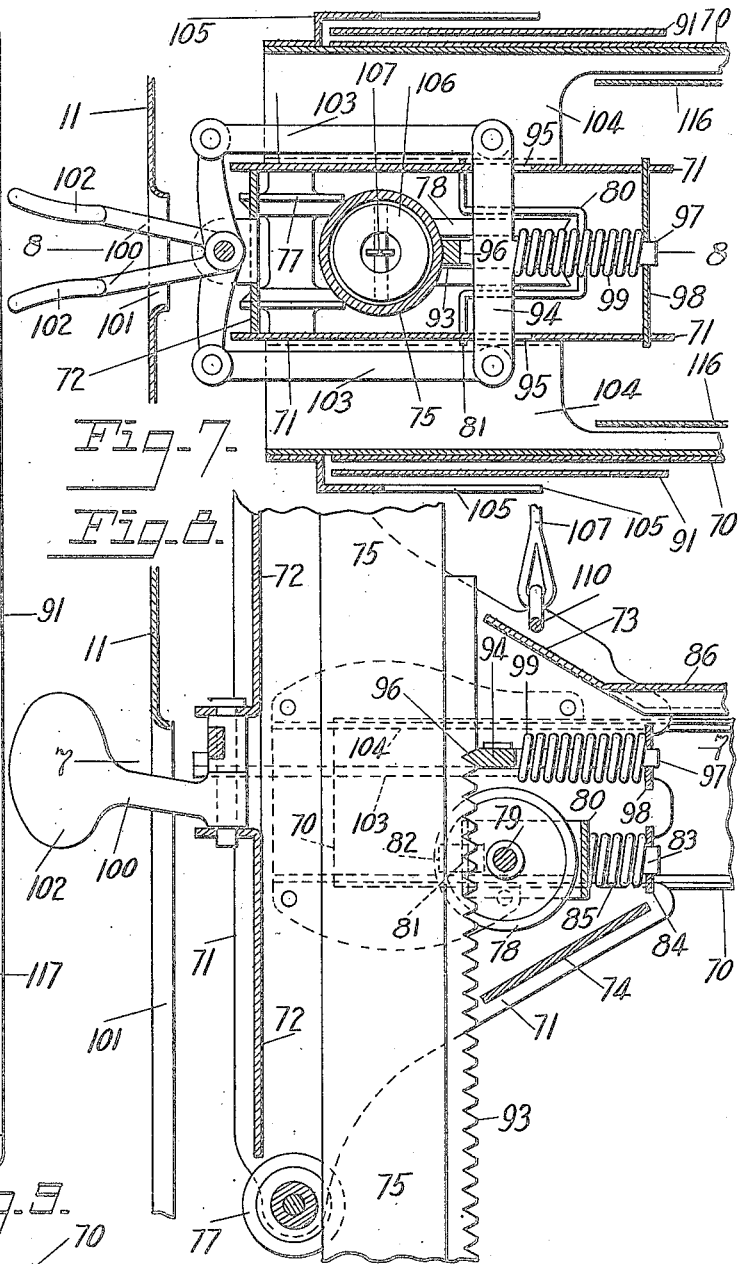
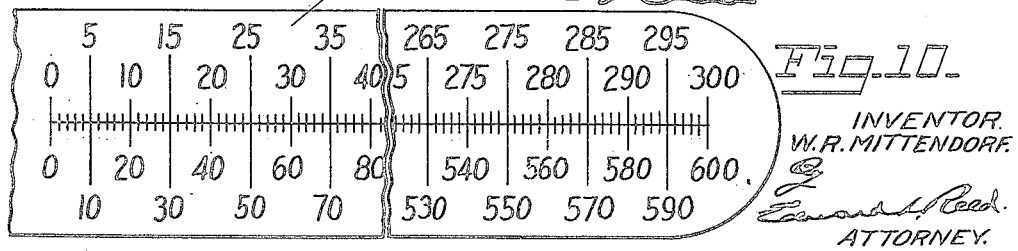
INVENTOR.  
W. R. MITTENDORF.  
ATTORNEY.

Patented Nov. 22, 1927.

1,650,228

UNITED STATES PATENT OFFICE.

WILLIAM R. MITTENDORF, OF CINCINNATI, OHIO, ASSIGNOR TO THE WATSON EXPERIMENTAL LABORATORY COMPANY, OF DAYTON, OHIO, A CORPORATION OF OHIO.

COMPUTING SCALE.

Application filed December 2, 1925. Serial No. 72,646.

This invention relates to scales and more particularly to what is known as a computing scale.

One object of the invention is to provide such a scale for computing the money value of a commodity at a predetermined price per pound.

A further object of the invention is to provide such a scale in which the weighing operation will be automatic and in which the computing operation will require no computation on the part of the operator and no action on the part of the operator other than the placing of the commodity on the weighing mechanism and the adjustment of an indicating member to a position which is significant of the price per pound at which the computation is to be effected.

A further object of the invention is to provide such a scale which will compute the money value of a commodity at any price per pound within the range of the scale without in any manner changing the mechanical multiplication of leverage which exists in the scale.

A further object of the invention is to provide such a scale in which the computation will be effected on a single series of graduations.

A further object of the invention is to provide such a scale which will indicate simultaneously the weight of the commodity, the money value thereof and the price per pound on which the computation is based.

A further object of the invention is to provide such a scale in which the weight of the commodity, the money value thereof and the price per pound on which the computation is based will be displayed simultaneously to both the salesman and the customer.

A further object of the invention is to provide such a scale which will be simple in its construction, accurate in operation and durable in service.

Other objects of the invention will appear as the device is described in detail.

In the accompanying drawings Fig. 1 is a front elevation, partly broken away, of a scale embodying my invention; Fig. 2 is a vertical section taken on the line 2—2 of Fig. 3; Fig. 3 is a vertical section taken on the line 3—3 of Fig. 2; Fig. 4 is a sectional view taken on the line 4—4 of Fig. 2; Fig. 5 is a section taken on the line 5—5 of Fig. 2; Fig. 6 is a section taken on the line 6—6 of Fig. 2; Fig. 7 is a transverse sectional detail view of the carriage for the computing chart; Fig. 8 is a section taken on the line 8—8 of Fig. 7; Fig. 9 is a facsimile of the price per pound chart; Fig. 10 is a facsimile on an enlarged scale of a portion of the computing chart; Fig. 11 is a section taken on the line 11—11 of Fig. 2; Fig. 12 is a side elevation of the bracket connecting the wire with the indicator arm; Fig. 13 is a section taken on the line 13—13 of Fig. 12; and Fig. 14 is a detail view of the yoke forming part of the carriage.

In these drawings I have illustrated one embodiment of my invention and have shown the same as associated with a gravity operated weighing mechanism in which the main lever is of the first order and is controlled by a pendulum of the reverse type. It will be obvious, however, that these are matters of expediency, that the invention may be associated with weighing mechanism of various kinds and that where a gravity operated weighing mechanism is employed the lever and its associated devices may be arranged in any suitable manner. Further, it will be understood that the particular computing mechanism here illustrated has been chosen for the purpose of illustration only and that this mechanism may take various forms without departing from the spirit of the invention.

The particular scale here illustrated comprises a base 10 which constitutes a support for the various parts of the weighing and computing mechanism. The several parts of the mechanism are enclosed in a casing 11, the front and rear walls of which have relatively large openings 12 through which the results of the computation may be read, these openings being preferably closed by suitable transparent material, such as panes of glass 13.

The weighing mechanism comprises a main lever 14 having a transverse portion 15 which is pivotally supported by means of knife edge pivots 16 mounted in the respective ends thereof and engaging V-shaped bearings 17 carried by standards 18 extending upwardly from the base 10. Extending laterally from the transverse portion 15 of the lever are two arms 19 which carry knife edge pivots 20 on which rest V-bearings 21 carried by the load supporting structure, This load supporting structure may be of any suitable character but it is here shown as comprising a flat platform 22 which is supported by the arms of a spider 23 rigidly secured to a cross head 24 which carries the V-bearing 21. The ends of the spider arms are upturned, as shown at 25, to engage the edges of the platform 22 and the spider is secured to the cross head 24 by a central screw 26 and is held against rotatory movement with relation thereto by means of a pin or screw 27. If desired, a guard plate 28 may be secured to the adjacent arms of the spider and extend upwardly above the platform 22 at the rear side thereof to prevent the commodity or load on the platform from engaging the casing 11 of the scale. The weighing mechanism is also provided with a tare beam 29 having thereon a tare poise 30. I have also shown a scoop poise 31 pivotally mounted on the arm 14$^a$ which carries the tare beam and adapted to be moved from one position to the other to compensate for the presence or absence of the scoop on or from the platform 22. The vibrations of the weighing mechanism may be controlled by means of a dash pot if desired and, in the present instance, I have shown a dash pot 32 mounted in the base 11 and comprising a piston 33, the rod 34 of which is pivotally connected with the lever 14. The weighing mechanism being of the gravity operated type it is important that the mechanism should be maintained in a level position and to this end the base may be mounted on adjusting screws 35.

Associated with the weighing mechanism is a pivoted indicating member which is of such a character and is so connected with the weighing mechanism that it will be moved by the operation of the weighing mechanism into a position corresponding to the weight of the load. Cooperating with this pivoted indicating member is a normally stationary indicating member which extends transversely to the pivoted indicating member and which may be adjusted toward and from the axis of the pivoted indicating member to position the same according to a unit of computation. Associated with this normally stationary indicating member is a unit value chart, here shown as a price per pound chart, with relation to which the normally stationary indicating member is positioned. One of the indicating members is provided with a longitudinally extending series of graduations which are so arranged that the particular graduation which lies at the point of intersection of the two indicating members will represent the result of the computation. In the present arrangement the normally stationary indicating member carries the series of graduations and constitutes the computing chart, and the significance of the graduations varies in accordance with the distance between the reading line of the chart and the axis of the pivoted indicating member. A weight chart also cooperates with the pivoted indicating member and is so arranged that the indicating member will indicate the weight of the commodity simultaneously with the indication of the value of that commodity. Preferably the two indicating members and their associated charts are provided in duplicate, one set being arranged at the front of the scale and the other at the rear of the scale, so that the weight, price per pound and computed value will be accessible simultaneously to the salesman and to the customer. I will describe but one set of indicating members and charts and it will be understood that this description and the reference numerals connected therewith apply in like manner to both sets of indicating members and charts.

The pivoted indicating member preferably comprises a long thin indicating element, such as a wire 36 and will be herein referred to as the "wire". It will be understood, however, that this indicating element may be of any suitable material and in practice will probably consist of a strand of silk as such a strand may be more easily maintained taut and straight than a strand of metal. The wire 36 is connected at its upper end with one end of an arm 37, the upper end portion of which is offset to support the wire in a line spaced from the body of the arm. The lower portion of the arm 37 is rigidly secured to a hub unit pivotally mounted on a fixed axis and here shown as comprising a hub 38 having rigidly secured thereto, by means of screws 39, a pivot pin 40, the end portions of which project beyond the hub member and have knife edges which rest on V-bearings 41 carried by arms 42 rigidly secured to and forming a part of a bracket 43 which is mounted on the base 11. Rigidly secured to the hub member 38 near the center thereof and, if desired, formed integral therewith is a vertical plate 44 which is provided at each side with a pair of studs or bosses 45 to which the lower ends of the two arms 37 are respectively secured, so that the arms will move with the hub unit about its axis. Rigidly secured to the lower end of each arm 37 is a bracket 46 on the outer end of which is pivotally mounted a bell crank lever 47, one arm of which extends upwardly from the bracket and the other arm of which is substantially parallel with the bracket. The vertical arm of the lever has at its lower end a lug 48 to which is secured the lower end of a coiled spring 49, the upper end of which is secured to the indicator wire 36 and serves to maintain that wire taut and straight. It is important that the indicator wire 36 should lie in a plane intersecting the axis of the hub unit and to permit of the adjustment of the wire to position it in, and maintain it in, this plane the vertical arm of the lever has at its upper end a lug 50 having therein a slot or kerf in which the wire lies, so that the movement of the lever about its axis will adjust the wire with relation to the axis of the hub unit. The lever is adjusted and retained in adjusted positions by means of screws 51 mounted in lugs 52 carried by the horizontal arm of the lever 47 and engaging respectively the upper and lower edges of the bracket 46.

The hub unit may be connected with the lever 14 in various ways but I prefer to utilize a flexible connection and have here shown a metal ribbon or tape 53 extending about and secured at its upper end to a cam 54 which is rigidly secured to the hub member 38. A stirrup 55 is secured to the lower end of the ribbon 53 and provided with a bearing to receive a needle point pivot 56 which is carried by a nose iron 57 adjustably mounted in a socket 58 in the end of the lever 14 and secured in adjusted positions therein by means of a set screw 59. In that form of the mechanism here illustrated, the hub unit and the parts carried thereby serve as the counterbalance for the lever 14 and constitute in effect a pendulum of the reverse type. This feature requires that the center of gravity of the hub unit and the parts carried thereby be established at the proper distance from the axis thereof and at the proper angle with relation to the vertical line through said axis and to that end I have rigidly but adjustably connected with the hub unit a weight 60, screw threaded onto a rod 61 and held in adjusted position thereon by set screws 62. The rod 61 is secured at that end adjacent to the axis of the hub unit to an annular member or apertured plate 63 which fits about a cylindrical portion of the hub member 38 concentric with the axis thereof. The angular position of the rod 61 with relation to the hub unit is controlled by screws 64 mounted in lugs 65 carried by the plate 44 and engaging the respective sides of the rod. The wire and its supporting arm are here shown as associated with the pendulum counterbalance in such a manner that the dead weight thereof will be a part of the counterbalance but obviously this is not essential to the operation of the device and the wire and its supporting arm may be mounted in any suitable manner. Stops are provided to positively limit the movement of the lever 14 of the weighing mechanism and, in the present device, these stops comprise rubber buffers 66 carried by a bracket 67 mounted on the base 11. Similar stops are also provided to limit the movement of the hub unit and, as here shown, a rubber buffer 68 is mounted at the upper end of the bracket 67 in the path of the plate 44 and a rubber buffer 69 is mounted on the bracket 43 in the path of the plate 44.

The computing chart, which is shown at 70, may be of any suitable character but preferably is in the form of an elongated plate having a single series of graduations extending longitudinally thereof and intersected by a so-called "base line" or "reading line". This chart may be mounted in any suitable manner in which it will be supported normally in a stationary position. In the present embodiment of the invention the chart is mounted on a carriage which in turn is mounted for vertical movement along a fixed guide. As here shown, the carriage comprises two side members 71 spaced apart and connected one to the other by spreader plates 72, 73 and 74. The guide for the carriage may take various forms but I prefer to provide the bracket 43 with an upwardly extending cylindrical projection or standard 75 which constitutes the guide for the carriage. The carriage is of greatest length at its outer side and its upper and lower edges converge inwardly. Mounted at the upper and lower ends of the longer outer side of the carriage are rollers 76 and 77 shaped to fit about the cylindrical surface of the standard 75. Mounted on the inner portion of the carriage is a third roller 78 also shaped to fit about the cylindrical surface of the standard 75. This latter roller is preferably yieldably mounted and to this end I have shown it as carried by a shaft 79 mounted in a yoke 80 which is slidably mounted in the carriage, preferably by providing the side members of the yoke with outturned portions 81 which are slidably supported in slots 82 in the side members 71 of the carriage. Secured to the transverse portion of the yoke is a stud 83 which extends inwardly therefrom and is slidably mounted in a bar 84 extending transversely to the carriage and supported at its ends by side plates 71. A spring 85, which is coiled about the stud 83 and confined between the plate 84 and the yoke, presses the roller 78 toward the standard and presses the carriage as a whole inwardly so as to draw the rollers 76 and 77 tightly against the standard. The roller 78 being arranged in an intermediate position between the upper and lower rollers 76 and 77 it will be apparent that the carriage will be supported firmly in position on the standard but will be freely movable lengthwise of the standard. In order to hold the carriage against rotatory movement about the axis of the standard an arm 86 is rigidly secured to the spreader plate 73 and may, if desired, be formed integral therewith. This arm extends across the casing 11 and has secured to its end portion a stud 87 on which is mounted a roller 88 which travels in a slot 89 formed in a standard 90 rigidly secured to the base 10 near that side of the casing opposite the standard 75. Rigidly secured to each side member 71 of the carriage is a bracket 104 to which the respective computing charts 70 are rigidly secured.

Various means may be provided for adjusting the carriage and computing chart and for securing the same in adjusted positions. The chart is adjusted according to a unit of computation which, in the present instance, is the price per pound of the commodity, the value of which is to be determined. In the present apparatus I have mounted within the main casing 11 a chart or plate 91 having thereon a series of graduations 92 which represent various prices per pound, these prices being indicated by numerals arranged adjacent to the respective graduations, and in the present chart at the right hand side of the graduations. It will be noted that the prices per pound range from five cents to forty cents in one-half cent graduations. I have also provided a second series of numerals in the present instance on the left hand side of the graduations, which indicate the price per pound from thirty to forty cents in one cent graduations and from forty to eighty cents in five cent graduations. This series of graduations extends substantially parallel with the indicator wire when the latter is in its normal position, in which position it intersects the zero graduation on the computing chart 70. Rigidly secured to the standard 75 and extending lengthwise thereof is a toothed bar 93 the teeth of which are separated by V-shaped recesses. Mounted on the carriage is a detent which cooperates with this toothed bar and which is here shown as comprising a cross bar 94, the ends of which extend through and are slidably mounted in slots 95 in the side members 71 of the carriage. A V-shaped nose 96 projects from the cross bar toward the teeth of the bar 93 and is adapted to enter the space between any two of those teeth. Extending inwardly from the cross bar 94 is a rod 97 which is slidably mounted in a plate 98 carried by the side members 71. A spring 99 coiled about the rod 97 and confined between the plate 94 and the cross bar serves to press the detent toward the toothed bar and to force the nose thereof into any one of the recesses with which it may be in alinement. The detent is so arranged with relation to the base or reading line of the computing chart 70, and the teeth on the bar 93 are so arranged with relation to the graduations on the price per pound chart 91, that when the detent is fully seated in any one of the recesses of the toothed bar, the base line of the computing chart will be in horizontal alinement with that graduation on the price per pound chart which corresponds to the recess in which the retent is seated. It will be apparent that if the adjustment of the carriage has not brought the center line of the computing chart into accurate alinement with the significant price per pound graduation the V-shaped nose of the detent will be forced against the inclined wall of the recess 70 and the carriage thus shifted to properly aline the chart with the price per pound indication. Pivotally mounted on the spreader plate 72 at the outer side of the carriage are two bell crank levers 100. One arm of each lever extends through a vertical slot 101 in the adjacent wall of the casing 11 and the two arms are provided with finger pieces 102 by means of which they may be pressed one toward the other. The other arms of the two levers project beyond the respective sides of the carriage and are connected by links 103 with the respective ends of the bar 94 of the detent. Consequently when the arms 100 of the bell crank levers are moved one toward the other, or pinched together, the detent will be forced inwardly against the action of the spring 99 and disengaged from the toothed bar 93, thereby permitting the carriage to be moved lengthwise of the standard. Secured to each bracket 104 is a pointer or indicator 105 which overlaps the price per pound chart 91 and serves to indicate thereon the position of the computing chart with relation thereto. As here shown, this indicator comprises a slotted member the slot in which is of such a character that the graduations 92 of the price per pound chart will be successively visible therethrough as the carriage is adjusted along the standard, and the indicator is so arranged with relation to the computing chart that that particular price per pound graduation which is visible through the slot therein will register with the center line of the computing chart.

In order that the carriage and computing chart may be moved in either direction with equal ease the weight of the carriage and the parts carried thereby is counterbalanced by means of a weight 106 which is connected with one end of a cable 107 which extends about a pulley 108 mounted on a bracket 109 secured to the standard 75 above the carriage, and then extends downward and is connected with the carriage. As here shown, the last mentioned end of the cable is attached to a cross rod 110 the ends of which are secured to the respective side members 71 of the carriage. To prevent the accidental displacement of the cable 108 a guard 111 is secured to the bracket 109 and extends across the top of the pulley. In the present instance, the standard 75 is hollow and the weight 106 is mounted within this tubular standard. In order to prevent the carriage from being moved with undue force, particularly in a downward direction, the weight 106 is so arranged in the tubular standard that there is a comparatively small clearance between the same and the walls of the standard and the lower end of the standard is closed, as by means of a plug 112, thus converting the standard in effect into an air dash pot which acts as a choke to prevent the rapid upward movement of the weight and thereby prevents the rapid downward movement of the carriage, it being obvious that the weight can move upwardly no faster than air can pass between the same and the walls of the standard. Should it be found desirable a check valve 112ª may be inserted in the lower portion of this hollow standard to permit the more rapid escape of the air when the weight moves downwardly. Further, if desired, stops, such as rubber cushions 113, may be arranged in the path of the carriage to check its movement in either direction, such stops being in the present instance mounted, respectively, on the brackets 43 and 109.

The end of the indicator 36 projects beyond the computing chart and travels over a weight chart 114 which is carried by a plate 115 which is rigidly secured at one side to the bracket 109 and at the other side to the standard 90. Consequently the indicator will indicate the weight of the commodity on the chart 114 simultaneously with the indication of the value of the commodity on the computing chart. The openings in the front and rear walls of the casing, below the lower edges of the plates 115 are closed by cover plates 116 which, in the present instance, are secured at one side to the bracket 43 and at the other side to the standard 90. These cover plates are spaced back from the glass closures 13 to permit of the free movement of the indicating members in the space between the same.

The operation of the mechanism will be readily understood from the foregoing description of the several parts thereof, and it will be apparent that the indicator wire 36 will be moved to a given position by a load of a given weight and that the particular graduation on the computing chart which is intersected by the indicator when it has been moved to that position will depend upon the distance of the base line of the chart from the axis of the indicator, that is, the axis of the hub unit. If the chart 70 is in its uppermost position, in the arrangement here shown, the computation will be effected on the basis of forty cents per pound and if a commodity weighing five pounds is placed on the weighing mechanism the indicator wire will intersect the two dollar graduation, thus indicating that the value of the commodity is two dollars. If the chart is adjusted to its lowermost position in which, in the present instance, it will be in line with the five cent per pound graduation the indicator wire when positioned by a five pound load on the weighing mechanism will intercept the twenty-five cent graduation on the chart, thus indicating that the value of the commodity is twenty-five cents. Thus the significance of the graduations on the computing chart vary according to the distance between the base line of the chart and the axis of the pivoted indicator, that is to say, the greater the distance between the base line of the chart and the axis of the pivoted indicator the greater the number of graduations on the chart which will be traversed by the indicator under the influence of a given load.

It will be observed that the weight capacity of the present scale is ten pounds and should it be desired to compute the value of a commodity of greater than ten pounds the tare poise 30 may be utilized to raise the weighing capacity of the scale, and to enable the computation to be effected under these circumstances the price per pound chart 91 is provided with series of numerals at the right hand and left hand sides thereof, as shown at 117 and 117ª, which represent the value of ten pounds at each price per pound indicated. Thus if a commodity weighing fifteen pounds is placed upon the weighing mechanism and the tare poise moved to its left hand or ten pound position on the beam the indicator 36 will indicate five pounds on the weight chart 114 and if the commodity is priced at twenty-five cents a pound the indicator will indicate the value of one dollar and twenty-five cents on the computing chart 70, that is, the value of the five pounds in excess of the ten pounds which has been counterbalanced by the tare poise. This value of one dollar and twenty-five cents as indicated on the computing chart is then added to the ten pound valuation as it appears in the column 117 opposite the twenty-five cent per pound graduation on the chart 91, that is, two dollars and fifty cents, thus giving the total value of the commodity as three dollars and seventy-five cents.

It will also be noted that the computing chart 70 carries two series of numerals arranged respectively above and below the single series of graduations. This chart, as shown more clearly in Fig. 10, is provided with three hundred graduations and the upper row of numerals represent the values at one cent per graduation, thus giving a maximum indicated value of three dollars. The lower series of numerals are such as to give to each graduation the value of two cents, thereby giving a maximum indicated value of six dollars. In practice the two rows of numerals will be printed in different colors to readily distinguish the same, for example, the upper series may be printed in black and the lower series in red. It will also be noted that the price per pound chart 91 has a range of prices from five cents to forty cents per pound at the right hand side of the price graduations and that these graduations are in one-half cent values, that is, any price between five and forty cents can be computed on a one-half cent basis. On the left hand side of the series of graduations is another column of figures representing the prices per pound from thirty to forty cents by one cent graduations and from forty to eighty cents by five cent graduations. In practice the numerals on the right hand side of the graduations on the price per pound chart will be of the same color as the upper series of numerals of the computing chart and the numerals on the left hand side of the graduations on the price per pound chart will be of the same color as the lower series of numerals on the computing chart. Inasmuch as the direct weighing capacity of the scale is ten pounds and the computing capacity of the chart 70 in one cent value graduations is three dollars it will be apparent that commodities weighing up to ten pounds can have their value computed by one cent price graduations up to thirty cents per pound and, further, commodities valued at from thirty to forty cents per pound can also have their values computed by one cent price graduations provided the weights thereof do not give a value in excess of three dollars. For example, the maximum weight which can be computed in one cent graduations at forty cents per pound is seven pounds and eight ounces and the maximum weight which can be computed in one cent graduations at thirty-five cents per pound is approximately eight pounds and nine ounces. However, the value of commodities priced higher than thirty cents per pound but not exceeding eighty cents per pound may be computed on a two cent basis by reading the lower row of numerals on the chart 70 and when so read commodities weighing as high as ten pounds may be computed up to sixty cents per pound and between sixty and eighty cents per pound the weight is limited by the computed capacity of the chart in the manner above set forth in connection with the computations in the upper row of numerals at from thirty to forty cents per pound. In that type of store scale now in common use the weight graduations are evenly spaced, that is, the distance between the zero and one pound graduations is the same as that between the nine pound and ten pound graduations, thus implying that equal increments of movement of the indicator correspond to the equal increments of weight. In the present scale the weight graduations are unevenly spaced, the spaces between adjacent pound graduations decreasing as the value of the pound graduations increases, that is to say, the distance between the zero and one pound graduations is materially greater than the distance between the nine pound and ten pound graduations, and the indicator wire 36 therefore travels unequal distances when registering successive equal increments of weight. This unequal spacing of the graduations has an advantage because the percentage of error which may creep in to the reading of the indication will be uniform at either small or large weights. For example, in a scale with evenly spaced graduations an error of one one-hundredth of a pound in reading the indication for a one pound load would be an error of one percent, whereas on a ten pound load the same amount of error would be only one-tenth of one percent, therefore it is important that on small weights the indication should be read with a very fine degree of accuracy or very material losses will occur whereas on larger weights the loss is proportionately less. In the present scale the spacing of the graduations is automatically proportionate to the weight of the commodity and it will be observed that the graduations on low weights are very coarse while those on the larger weights are comparatively fine.

Further, it will be apparent that with the present scale the weight of the commodity, the price per pound at which it is sold and the computed value thereof are indicated on both sides of the scale so that all factors in the transaction are accessible to the customer. This result primarily is obtained from the fact that the computation is effected by means of a single series of graduations, one only of which is intersected by the indicator in effecting the computation. In the computing scales now in common use this result cannot be secured because the character of these scales necessitates that there shall be a computing indication for each and every price per pound. Therefore if these computing indications were duplicated for the benefit of the customer there would be not only a confusing multiplication of lines and figures which the customer would not understand but there would be no means to indicate to the customer which one of the several indications was being read by the salesman making the computation. Consequently the present day scales do not attempt to indicate the computation to the customer but usually indicate the weight only to the customer.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a computing scale, two indicating members, one of which is pivotally mounted and the other of which is supported normally in a fixed position to intersect said pivoted indicating member, one of said indicating members having a series of graduations extending lengthwise thereof, load controlled means for actuating said pivoted indicating member, and means for adjusting said other indicating member to different operative positions at varying distances from the axis of said pivoted indicating member to cause different graduations on said fixed indicating member to be indicated by said pivoted indicating member under the influence of a given load.

2. In a computing scale, a pivoted indicating member, load controlled means for actuating said pivoted indicating member, a normally stationary indicating member intersecting said pivoted indicating member, and means for adjusting said normally stationary indicating member toward and from the axis of said pivoted indicating member to position the same according to a unit of computation, one of said indicating members having a series of graduations so arranged that the graduation which is intersected by the other indicating member will represent the result of the computation.

3. In a computing scale, a pivoted indicator, load controlled means for actuating said indicator, a normally stationary chart extending substantially parallel with the plane of movement of said indicator and intersecting said indicator, and means for adjusting said chart toward and from the axis of said indicator to position the same according to a unit of computation and cause different graduations thereon to be intersected by said indicator when the latter is moved to a given position.

4. In a computing scale, a pivoted indicator, load controlled means for actuating said indicator, a normally stationary chart extending at a substantially right angle to and intersecting said indicator when the latter is in its normal position and having a series of graduations extending lengthwise thereof, and manually operated means to adjust said chart toward and from the axis of said indicator to position the same according to a unit of computation and cause different graduations thereon to be intersected by said indicator when the latter is moved to a given position.

5. In a scale, a computing chart having a series of graduations and a base line intersecting said graduations, an indicator pivotally mounted and arranged to register with the said graduations at their intersections with said base line to indicate the result of a computation, load controlled means for actuating said indicator, means to adjust said chart with relation to the axis of said indicator according to a unit of computation, and means to indicate the value of said unit.

6. In a scale, a computing chart having a single series of graduations and a base line intersecting said graduations, an indicator pivotally mounted and arranged to register with the said graduations at their intersections with said base line to indicate the result of a computation, load controlled means for actuating said indicator, means to vary the significance of the graduations on said chart according to a unit of computation, and means to indicate the value of said unit.

7. In a scale, load controlled weighing mechanism, a pivoted indicator actuated thereby, a computing chart having a single series of graduations and a base line intersecting said graduations, said indicator cooperating with the said graduations at their intersections with said base line to indicate the result of a computation, means to vary the significance of the graduations on said chart, and means to indicate said significance.

8. In a computing scale, a pivoted indicator, load controlled means for actuating said indicator, a stationary member having a series of unit value graduations extending lengthwise of said indicator when the latter is in its normal position, an indicating member extending transversely to and intersecting the first mentioned indicator and adjustable with relation to said unit value graduations, and means for securing the last mentioned indicating member in its adjusted position.

9. In a computing scale, a pivoted indicator, load controlled means for actuating said indicator, a stationary member having a series of unit value graduations extending lengthwise of said indicator when the latter is in its normal position, a chart extending transversely to and intersecting said indicator and adjustable into line with any one of said graduations, and means for securing said chart in its adjusted position.

10. In a computing scale, a weight actuated member, a hub unit mounted on a fixed axis, means for operatively connecting said hub unit with said weight actuated member, an arm rigidly secured to said hub unit, an indicator wire carried by said arm, means carried by said arm for adjusting said wire with relation to the axis of said hub unit, an indicating member extending transversely to and intersecting said wire, and means for adjusting said indicating member with relation to the axis of said hub unit.

11. In a computing scale, a weight actuated member, a hub unit mounted on a fixed axis, means for operatively connecting said hub unit with said weight actuated member, an arm secured to said hub unit, and having its outer end offset, an indicator wire secured to the offset end of said arm, a bracket secured to said arm, a lever mounted on said bracket, a spring connected at one end with said lever and at the other end with said wire, said lever having a part spaced from the axis thereof and provided with a kerf to receive said wire, means for adjusting said lever to position said wire with relation to the axis of said hub unit, an indicating member arranged to intersect said wire, and means for adjusting said indicating member with relation to the axis of said hub unit.

12. In a computing scale, a pivoted indicator, load controlled means for actuating said indicator, a carriage mounted for adjustment toward and from the axis of said pivoted indicator, means for securing said carriage in adjusted positions, and an indicating member mounted on said carriage and intersecting said indicator.

13. In a computing scale, a pivoted indicator, load controlled means for actuating said indicator, a guide, a carriage mounted on said guide for movement toward and from the axis of said indicator, a chart mounted on said carriage and intersecting said indicator, and means for securing said carriage in adjusted positions on said guide.

14. In a computing scale, a pivoted indicator, load controlled means for actuating said indicator, a stationary chart having a series of unit value graduations, a guide extending lengthwise of said series of unit value graduations, a carriage mounted on said guide, an indicating member mounted on said carriage and intersecting said indicator, and means for securing said carriage in adjusted positions and alining said indicating member with a selected one of said unit value graduations.

15. In a computing scale, a pivoted indicator, load controlled means for actuating said indicator, a stationary chart having a series of unit value graduations, a guide extending lengthwise of said series of unit value graduations, a carriage mounted on said guide, a computing chart mounted on said carriage, intersecting said indicator and having a single series of graduations extending lengthwise thereof, and means for securing said carriage in an adjusted position on said guide and alining the series of graduations on said computing chart with a selected one of said unit value graduations.

16. In a computing scale, a pivoted indicator, load controlled means for actuating said indicator, a standard extending substantially parallel with the normal position of said pivoted indicator, a carriage mounted on said standard and comprising two rollers spaced apart to engage one side of said standard, and a yieldable roller to engage the other side of said standard between the points of engagement of the first mentioned rollers, a chart rigidly secured to said carriage, intersecting said pivoted indicator and having a series of graduations, and means mounted on said carriage for securing the same in adjusted positions on said standard.

17. In a computing scale, a pivoted indicator, load controlled means for actuating said indicator, a standard extending substantially parallel with the normal position of said pivoted indicator and having a series of recesses, a carriage mounted on said standard for adjustment lengthwise thereof, a detent mounted on said carriage, a spring acting on said detent to press the same into a selected one of the recesses in said standard, manually operated means for retracting said detent and adjusting said carriage along said standard, and a chart rigidly secured to said carriage, intersecting said pivoted indicator and having a series of graduations extending lengthwise thereof.

18. In a computing scale, a pivoted indicator, load controlled means for actuating said indicator, a standard extending substantially parallel with the normal position of said pivoted indicator and having a series of recesses, a carriage mounted on said standard for adjustment lengthwise thereof, a detent slidably mounted on said carriage for movement into and out of a selected one of said recesses, a spring acting on said detent to press the same into one of said recesses, bell crank levers pivotally mounted on said carriage and having parts forming finger pieces whereby said levers may be actuated, links connecting said levers with said detent, and a chart rigidly secured to said carriage, intersecting said pivoted indicator and having a series of indications extending lengthwise thereof.

19. In a computing scale, a base, a casing mounted on said base, a pivoted indicator mounted within said casing, load controlled means for actuating said indicator, a standard mounted on said base and extending substantially parallel with the normal position of said pivoted indicator, a carriage mounted on said standard and comprising a pair of spaced rollers to engage one side of said standard, and a single yieldable roller to engage the other side of said standard at a point between the first mentioned rollers, said standard having a series of recesses extending lengthwise thereof, a detent slidably mounted on said carriage for movement into and out of engagement with a selected one of said recesses, a spring acting on said detent to press the same into one of said recesses, a pair of bell crank levers pivotally mounted on said carriage, said levers having parts extending transversely to said carriage in opposite directions, links connecting said parts with said detent, said bell crank levers having other parts extending therefrom to form finger pieces by means of which said levers may be simultaneously actuated, said casing having a slot through which the last mentioned parts extend, and a chart mounted on said carriage, intersecting said pivoted indicator and having a series of graduations extending lengthwise thereof.

20. In a computing scale, a pivoted indicator, load controlled means for actuating said indicator, a guide extending substantially parallel with the normal position of said pivoted indicator, a carriage slidably mounted on said guide for adjustment toward and from the axis of said pivoted indicator, means for securing said carriage in adjusted positions with relation to said guide, a chart mounted on said carriage, intersecting said pivoted indicator and having a series of graduations extending lengthwise thereof, and means for counterbalancing the weight of said carriage and said chart.

21. In a computing scale, a pivoted indicator, load controlled means for actuating said indicator, a tubular standard extending substantially parallel with the normal position of said pivoted indicator, a carriage slidably mounted on said standard for adjustment toward and from the axis of said pivoted indicator, means for securing said carriage in adjusted positions on said standard, a chart mounted on said carriage, intersecting said pivoted indicator and having a series of graduations extending lengthwise thereof, a weight slidably mounted in said tubular standard, a guide arranged above said standard, and a cable extending about said guide and connected at one end with said carriage and at the other end with said weight.

22. In a computing scale, a pivoted indicator, load controlled means for actuating said indicator, a tubular standard extending substantially parallel with the normal position of said pivoted indicator, a carriage slidably mounted on said standard for adjustment toward and from the axis of said pivoted indicator, means for securing said carriage in adjusted positions on said standard, a chart mounted on said carriage, intersecting said pivoted indicator and having a series of graduations extending lengthwise thereof, a weight slidably mounted in said tubular standard, a guide arranged above said standard, a cable extending about said guide and connected at one end with said carriage and at the other end with said weight, said tubular standard being closed at its lower end, and said weight having a relatively small clearance between the same and the walls of said tubular standard, whereby said standard and said weight will constitute a dash pot to retard the movement of said carriage.

23. In a computing scale, a pivoted indicator, load controlled means for actuating said indicator, a standard extending substantially parallel with the normal position of said indicator, a carriage mounted on said standard for movement toward and from the axis of said pivoted indicator, means for securing said carriage in adjusted positions with relation to said indicator, a chart mounted in said carriage, intersecting said pivoted indicator and having a series of graduations extending lengthwise thereof, a fixed guide extending lengthwise of said standard, and a part connected with said carriage and engaging said guide to hold said carriage against rotatory movement on said standard.

24. In a computing scale, a pivoted indicator, load controlled means for actuating said indicator, a standard extending substantially parallel with the normal position of said indicator, a carriage mounted on said standard for movement toward and from the axis of said pivoted indicator, means for securing said carriage in adjusted positions with relation to said indicator, a chart mounted in said carriage, intersecting said pivoted indicator and having a series of graduations extending lengthwise thereof, a second standard extending substantially parallel with the first mentioned standard at a point spaced therefrom and having a longitudinal slot, and an arm rigidly secured to said carriage and having at its end a roller arranged to travel in the slot in the last mentioned standard.

25. In a computing scale, a pivoted indicating member, load controlled means for actuating said pivoted indicating member, a normally stationary indicating member intersecting said pivoted indicating member, means for adjusting the last mentioned indicating member toward and from the axis of said pivoted indicating member, one of said indicator members having a single series of graduations extending lengthwise thereof, and a plurality of series of numerals associated with the respective graduations and imparting different values thereto.

26. In a computing scale, a pivoted indicating member, load controlled means for actuating said pivoted indicating member, a unit value chart extending lengthwise of the normal position of said pivoted indicating member, a normally stationary computing chart intersecting said pivoted indicating member and adjustable along said unit value chart toward and from the axis of said pivoted indicating member, means for securing said chart in adjusted positions, said computing chart having a single series of graduations extending lengthwise thereof and having a plurality of series of numerals associated with the respective graduations to impart different values thereto and said unit value chart having a series of graduations and two series of numerals associated with the respective graduations to impart different values thereto.

27. In a computing scale, a weighing mechanism comprising a lever, a beam connected with said lever and a poise mounted on said beam and adapted to increase the normal weighing capacity of the scale, a pivoted indicating member, means for operatively connecting said pivoted indicating member with the lever of said weighing mechanism, a normally stationary indicating member, intersecting said pivoted indicating member, means for adjusting said normally stationary indicating member toward and from the axis of said pivoted indicating member, one of said indicating members having a series of graduations adapted to compute value up to the normal weighing capacity of said scale, a unit value chart associated with said normally stationary indicating member having a series of graduations and a series of numerals associated with said graduations to indicate the value thereof and also having a second series of numerals associated with the respective graduations to indicate the value of that portion of the load represented by weighing capacity of said beam, at the unit value of the particular graduation with which said numerals are associated.

28. In a scale, a computing chart having a single series of graduations and a base line intersecting said graduations, an indicator pivotally mounted and arranged to register with said graduations at their intersections with said base line to indicate the result of a computation, load controlled weighing mechanism for actuating said indicator, and means to adjust said chart with relation to the axis of said indicator according to a unit of computation, the several parts being arranged to disclose said indications on opposite sides of the scale.

29. In a scale, a computing chart having a single series of graduations and a base line intersecting said graduations, an indicator pivotally mounted and arranged to register with said graduations at their intersections with said base line to indicate the result of a computation, load controlled weighing mechanism for actuating said indicator, means to vary the significance of the graduations on said chart according to a unit of computation, and means to indicate the value of said unit, the several parts being arranged to disclose all of said indications on opposite sides of the scale.

30. In a scale, a computing chart having a single series of graduations and a base line intersecting said graduations, an indicator pivotally mounted and arranged to register with said graduations at their intersections with said base line to indicate the result of a computation, load controlled weighing mechanism for actuating said indicator, means to vary the significance of the graduations on said chart according to a unit of computation, means to indicate the value of said unit, and means to indicate the weight of a load carried by said weighing mechanism, the several parts being arranged to disclose all of said indications on opposite sides of said scale.

31. In a scale, a computing chart having a single series of graduations and a base line intersecting said graduations, an indicator pivotally mounted and arranged to register with said graduations at their intersections with said base line to indicate the result of a computation, means to vary the significance of the graduations on said chart according to a unit of computation, means to indicate the value of said unit, load controlled weighing mechanism for actuating said indicator, the movement of said indicator per unit of weight decreasing as the load increases, and means to indicate the weight of the load.

32. In a scale, a weight chart having a series of graduations, the spacing of which decreases as the denominations thereof increase, an indicator pivotally mounted to co-operate with said weight chart, load controlled weighing mechanism comprising a non-concentric cam for actuating said indicator, the movement of said indicator per unit of weight being variable in accordance with said graduations, whereby the sensitiveness of the said weighing mechanism will be proportionate to the weight of the load thereon.

33. In a scale, a computing chart having a single series of evenly spaced graduations and a base line intersecting said graduations, an indicator pivotally mounted and arranged to register with the said graduations at their intersections with said base line to indicate the result of a computation, load controlled weighing mechanism for actuating said indicator, means to vary the significance of said graduations according to a unit of computation, a weight chart having a series of unevenly spaced graduations to indicate the weight of the load, the spacing of said unevenly spaced graduations being determined by the spacing of said evenly spaced graduations on said computing chart as related to the value of the said unit of computation.

34. In a scale, a pivoted indicator, a computing chart having a single series of evenly spaced graduations and a base line intersecting said graduations, said base line being spaced from the axis of said indicator according to a unit of computation and arranged at right angles to and in intersection with said indicator when the latter is in its normal position, load controlled weighing mechanism for actuating said indicator, the movement of said indicator being variable per unit of weight, said variable movement being determined by the spacing of the graduations on said chart as related to the distance of said base line from the axis of said indicator.

35. In a scale, a computing chart having a single series of evenly spaced graduations and a base line intersecting said graduations, an indicator pivotally mounted and arranged to register with the said graduations at their intersections with said base line to indicate the result of a computation, means to adjust said chart so as to position said base line at varying distances from the axis of said indicator, a load supporting lever, a connection between said indicator and said lever comprising a cam whereby said indicator may be given variable degrees of movement per unit of weight carried by said lever, said variable movement being determined by the spacings of the graduations on said chart as related to the distance of said base line from the axis of said indicator.

36. In a computing scale, a movable indicator, load controlled means for actuating said indicator, a structure having a guideway, a carriage mounted for movement along said guideway, and an indicating member connected to said carriage and arranged to intersect said movable indicator at a point determined by the position of said carriage and the load on said scale.

37. In a computing scale, a movable indicator, load controlled means for actuating said indicator, a structure having a guideway, a carriage mounted for movement along said guideway, an indicating member connected to said carriage and intersecting said movable indicator, means for securing said carriage in adjusted positions along said guideway, a chart having unit value graduations, and an indicating member cooperating with said chart to designate the position of said carriage.

38. In a scale, a movable indicating member, a load controlled means for actuating said indicating member, a second indicating member supported normally in a fixed position to intersect the first mentioned indicating member to indicate the result of a computation, means for adjusting said second indicating member relative to said first mentioned indicating member according to a unit of computation, said indicating members being provided in duplicate on opposite sides of the scale.

39. In a scale, two movable and intersecting indicating members, one of which is actuated by a load controlled mechanism and the other of which is supported normally in a fixed position, but arranged for adjustment relative to the load controlled indicating member according to a unit of computation, one of said indicating members comprising a single series of graduations, a fixed chart having a series of weight graduations arranged to be intersected by said first mentioned indicating member, and indicating devices to designate the adjusted position of said second indicating member.

40. In a scale, an indicating device comprising a chart and an indicator to designate the weight of a commodity, a second indicating device adjustable to designate a unit of computation, a third indicating device comprising a single series of graduations intersected by the indicator of said first indicating device to designate the computed value of said commodity in accordance with a selected unit of computation, all of said indicating devices being provided in duplicate on opposite sides of the scale.

41. In a scale, an indicating device comprising a stationary chart and a movable indicator, the position of which signifies the weight of a commodity, a second indicating device adjustable to designate a unit of computation, a third indicating device adjustable in unison with said second indicating device, said third device comprising a single series of graduations adapted for all units of computation in intersection with the indicator of said first device to thereby designate the computed value of said commodity in accordance with the weight thereof, as determined by the position of the indicator of said first device and a selected unit of computation.

42. In a scale, a duplex indicating device comprising a pair of stationary charts and a pair of movable indicators which designate the weight of a commodity, a second duplex indicating device comprising a pair of stationary charts and a pair of movable indicators to designate a unit of computation, a third duplex indicating device comprising a pair of charts adjustable in unison with the indicators of said second indicating device, each of the charts of said third indicating device having a single series of graduations which are intersected by one of the indicators of the said first indicating device to thereby designate in duplicate the computed value of said commodity in accordance with the weight thereof as determined by the positions of the indicators of said first device and a selected unit of computation.

43. In a computing scale, two charts to express computed value in duplicate, one of said charts facing in a reverse direction to the other of said charts, two duplicate series of price per unit numerals arranged in columnar formation, one series for each of said charts, and an indicating device comprising two normally stationary but adjustable indicating members to register a selected price per unit in duplicate upon each of said series of price per unit numerals.

In testimony whereof, I affix my signature hereto.

WILLIAM R. MITTENDORF.